(12) United States Patent
Symons et al.

(10) Patent No.: US 8,140,010 B2
(45) Date of Patent: Mar. 20, 2012

(54) NEAR FIELD RF COMMUNICATORS AND NEAR FIELD RF COMMUNICATIONS ENABLED DEVICES

(75) Inventors: Peter R. Symons, Greinton (GB); Heikki Huomo, Meysey Hampton (GB)

(73) Assignee: Innovision Research & Technology PLC, Cirencester (GB)

( * ) Notice: Subject to any disclaimer, the term of this patent is extended or adjusted under 35 U.S.C. 154(b) by 320 days.

(21) Appl. No.: 12/446,591

(22) PCT Filed: Oct. 12, 2007

(86) PCT No.: PCT/GB2007/003895
§ 371 (c)(1),
(2), (4) Date: Apr. 22, 2009

(87) PCT Pub. No.: WO2008/050085
PCT Pub. Date: May 2, 2008

(65) Prior Publication Data
US 2010/0015917 A1 Jan. 21, 2010

(30) Foreign Application Priority Data
Oct. 24, 2006 (GB) .................................. 0621164.3

(51) Int. Cl.
*H04B 5/00* (2006.01)
(52) U.S. Cl. ...................................... 455/41.1
(58) Field of Classification Search .................. None
See application file for complete search history.

(56) References Cited

U.S. PATENT DOCUMENTS
7,720,438 B2 * 5/2010 Rowse ...................... 455/41.1
(Continued)

FOREIGN PATENT DOCUMENTS
EP 1394720 A2 3/2004
(Continued)

OTHER PUBLICATIONS
International Searching Authority—European Patent Office, International Search Report and Written Opinion for PCT/GB2007/003895, Feb. 29, 2008, 12 pages.
(Continued)

*Primary Examiner* — Lincoln Donovan
*Assistant Examiner* — Sibin Chen
(74) *Attorney, Agent, or Firm* — Sterne, Kessler, Goldstein & Fox P.L.L.C.

(57) ABSTRACT

A near field RF communicator (100) has an inductive coupler (102) and a first signal provider (109, 110, 111) to cause the inductive coupler to provide a first signal that when inductively coupled to the inductive coupler of another near field RF communicator in near field range is insufficient to cause initiation of communication with that other near field RF communicator. A sensor (116) senses a change in an impedance of the inductive coupler (102) due to inductive coupling of the first signal between the inductive couplers of the said near field RF communicator and a said other near field RF communicator in near field range. A controller (107) determines whether or not another near field RF communicator is in near field range on the basis of any change in impedance sensed by the sensor and, if another near field RF communicator is determined to be in near field range, causes a second signal to be inductively coupled to the other near field RF communicator to initiate communication between the two near field RF communicators. The sensor may use a phase detector (118) to enable a change in impedance to be sensed by detecting a change in a current-voltage phase relationship resulting from a change in impedance.

20 Claims, 4 Drawing Sheets

U.S. PATENT DOCUMENTS

| | | |
|---|---|---|
| 2005/0032472 A1 | 2/2005 | Jiang et al. |
| 2006/0170553 A1* | 8/2006 | Bierach ..................... 340/572.4 |
| 2010/0302040 A1* | 12/2010 | Davidowitz et al. ....... 340/572.7 |

FOREIGN PATENT DOCUMENTS

| | | |
|---|---|---|
| GB | 2170077 A | 7/1986 |
| GB | 2344257 A | 5/2000 |
| JP | 61203737 A | 9/1986 |
| WO | 9943096 A1 | 8/1999 |
| WO | 0065551 A1 | 11/2000 |
| WO | 2006076669 A1 | 7/2006 |

OTHER PUBLICATIONS

United Kingdom Patent Office, Patent Act 1977: Search Report Under Section 17(5) for Application No. GB0621164.3, Nov. 9, 2006, 3 pages.

* cited by examiner

NEAR FIELD RF COMMUNICATORS AND NEAR FIELD RF COMMUNICATIONS ENABLED DEVICES

CROSS REFERENCE TO RELATED APPLICATIONS

This application is a national stage application under 35 U.S.C. §371 of International Application No. PCT/GB2007/003895, filed Oct. 12, 2007, which claims the priority of United Kingdom Application No. 0621164.3, filed Oct. 24, 2006, the contents of which are herein incorporated by reference.

FIELD OF THE INVENTION

This invention relates to near field RF communicators and devices comprising near field RF communicators.

BACKGROUND OF THE INVENTION

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimeters (generally a maximum of 1 meter) are common for near field RF communicators.

Near field communication may be referred to as near-field RFID (Radio Frequency Identification) or near-field communication. NFC communicators are a type of near field RF communicator that is capable of both initiating a near field RF communication (through transmission or generation of an alternating magnetic field) with another near field RF communicator and of responding to initiation of a near field RF communication by another near field RF communicator. The term "near field RF communicator" includes not only NFC communicators but also initiating near field RF communicators such as RFID transceivers or readers that are capable of initiating a near field RF communication but not responding to initiation of a near field RF communication by another near field RF communicator and responding near field RF communicators such as RFID transponders or tags that are capable of responding to initiation of a near field RF communication by another near field RF communicator but not of initiating a near field RF communication with another near field RF communicator. Hence NFC communicators can act as both RFID transceivers and RFID transponders and are able to communicate with other NFC communicators, RFID transceivers and RFID transponders.

Examples of near field RF communicators are defined in various standards for example ISO/IEC 18092, ISO/IEC 14443, ISO/IEC 15693 ISO/IEC 21481.

Near field RF communicators may be provided as standalone or discrete devices or may be incorporated within or coupled to larger electrical devices or host devices (referred to below as near field RF communications enabled devices) to enable those devices to communicate by the near field with other near field RF communicators or devices incorporating or coupled to such near field RF communicators. When incorporated within a larger device or host, a near field RF communicator may be a discrete entity or may be provided by functionality within the larger device or host. Examples of such larger devices or host devices are, for example, mobile telephones, portable computing devices (such as personal digital assistants, notebooks, lap-tops), other computing devices such as personal or desk top computers, computer peripherals such as printers, or other electrical devices such as portable audio and/or video players such as MP3 players, IPODs®, CD players, DVD players.

SUMMARY OF THE INVENTION

Near field RF communicators and host devices of course require a power supply to function and maintenance of a sufficient power supply is of prime importance to the functioning of both the host device and the near field RF communicator. This may be a particular issue where a near field RF communicator or host device incorporating or coupled to a near field RF communicator is battery-powered, especially where the near field RF communicator or host device is being used in circumstances in which replacement of the battery is not possible and, where the battery is rechargeable, charging of the battery using a mains charging unit is not possible, for example because the user of the near field RF communicator or host device does not have the mains recharging unit with them or is in a location without access to a mains power supply point. The near field RF communicator may place an additional drain on the power supply of a host device, thereby exacerbating these power supply issues for the host device. Additionally, a sudden drop in or absence of suitable power supply may prevent or interrupt near field RF communication between one near field RF communicator and another near field RF communicator. Depending on the application of such communication this could result in a failure to complete a required function or action, for example, a failure to obtain access to a location, refusal of a ticket to travel, inability to purchase goods or transfer data or information between electrical devices.

One area of near field RF communication which causes particular concern from the point of power consumption is the fact that, in order to initiate a near field RF communication, an initiating near field RF communicator has to transmit an RF signal to wake up any responding near field RF communicator that may be in near field range and transmission of that RF signal and the subsequent waking up of the responding near field RF communicator takes both time and power and so represents a drain on the power source powering the initiating near field RF communicator.

In one aspect, the present invention provides apparatus for reading data from a data storage device that is arranged to communicate data in response to receipt of an activation signal, the apparatus comprising: a sense signal supplier operable to supply a sense signal insufficient to activate a data storage device in the vicinity of the apparatus to communicate data; a sensor operable to sense a change in an impedance associated with the sense signal supplier due to the presence of a data storage device in the vicinity of the apparatus; and an activation signal supplier operable to, in response to the sensor sensing the presence of a data storage device in the vicinity of the apparatus, supply an activation signal to activate the data storage device to communicate data.

In an embodiment, a near field RF communicator has an inductive coupler and a first signal provider to cause the inductive coupler to provide a first signal that when inductively coupled to the inductive coupler of another near field RF communicator in near field range is insufficient to cause initiation of communication with that other near field RF communicator. A sensor senses a change in an impedance of the inductive coupler due to inductive coupling of the first signal between the inductive couplers of the said near field RF communicator and a said other near field RF communicator in near field range. A controller determines whether or not another near field RF communicator is in near field range on the basis of any change in impedance sensed by the sensor and, if another near field RF communicator is determined to be in near field range, causes a second signal to be inductively coupled to the other near field RF communicator to initiate communication between the two near field RF communicators. The impedance change is such as to cause a change in the current-voltage phase relationship. The sensor may sense the phase change directly and/or indirectly. In the latter case, the phase change may be sensed by sensing a change in current and/or voltage amplitude.

In one aspect, the present invention provides apparatus for reading data from a data storage device that is arranged to communicate data in response to receipt of an activation signal, the apparatus comprising: an oscillator operable to provide an oscillating signal; a sense antenna; an oscillator controller operable to interrupt the oscillating signal to provide bursts of the oscillating signal to the sense antenna to provide a sense signal insufficient to activate a data storage device in the vicinity of the apparatus to communicate data; a detector operable to provide a detection signal representing a change in a current to voltage phase relationship resulting from mutual inductive coupling between the sense antenna and a data storage device in the vicinity of the apparatus; and a controller operable to determine that a data storage device is in the vicinity of the apparatus when the detector provides a detection signal indicative of the presence of a data storage device and to cause the oscillator controller to provide an activation signal to a read antenna to activate the data storage device to communicate data. The detector may be a phase detector that detects the current to voltage phase relationship directly. As another possibility or additionally, the detector may detect an amplitude change resulting from a change in the current to voltage phase relationship.

The read antenna may be the same antenna as the sense antenna or may be a separate antenna.

In one aspect, the present invention provides a near field RF communicator for initiating communication with other near field RF communicators, the near field RF communicator comprising: an inductive coupler operable to couple inductively to an inductive coupler of a said other near field RF communicator in near field range; a sense signal provider operable to cause the inductive coupler to provide a sense signal that when inductively coupled to the inductive coupler of a said other near field RF communicator in near field range is insufficient to cause initiation of communication with that other near field RF communicator; a sensor operable to sense a change in an impedance of the inductive coupler due to inductive coupling of the sense signal between the inductive couplers of the said near field RF communicator and a said other near field RF communicator in near field range; a determiner operable to determine whether or not a said other near field RF communicator is in near field range on the basis of any change in impedance sensed by the sensor; and an activation signal supplier operable, in response to the determiner determining that a said other near field RF communicator is in near field range, to supply an activation signal to initiate communication between the said near field RF communicator and the said other near field RF communicator.

In one aspect, the present invention provides a near field RF communicator for initiating communication with other near field RF communicators, the near field RF communicator comprising: a sense antenna operable to couple inductively with an antenna of a said other near field RF communicator in near field range; an RF signal provider operable to cause the sense antenna to provide a sense signal that when inductively coupled to the inductive coupler of a said other near field RF communicator in near field range is insufficient to cause initiation of communication with that other near field RF communicator; a detector operable to detect, directly or indirectly, a change in a phase relationship between a current through and a voltage of the sense antenna resulting from mutual inductive coupling of the sense signal between the sense antenna and the antenna of a said other near field RF communicator in near field range; and a controller operable to determine that a said other near field RF communicator is in near field range when the detector detects a change in the said phase relationship indicative of the presence of a said other near field RF communicator and to control the RF signal provider to cause an activation signal to be inductively coupled to the said other near field RF communicator in near field range to initiate communication.

In one aspect, the present invention provides a near field RF communicator operable to act as an initiator to initiate communication with a target near field RF communicator, the initiator being operable in a sense mode to provide a sense signal that enables the initiator to sense the presence in near field range of a target without initiating communication with the target and in a communication initiation mode in which the initiator is operable to provide a communication initiation signal to cause initiation of communication between the target and the initiator, the initiator being operable to sense a change in an impedance resulting from the presence of a target in near field range and to switch from the sense mode to the communication initiation mode in response to such a change in the impedance.

A near field RF communicator embodying the invention enables the in-range presence of a target near field RF communicator to be sensed without having to initiate communication with the target near field RF communicator thereby avoiding incurring the time and power costs involved in trying to communicate with or "wake up" a target near field RF communicator to initiate communication until the near field RF communicator has determined that there is actually a target near field RF communicator in near field range.

BRIEF DESCRIPTION OF THE DRAWINGS

Embodiments of the present invention will now be described, by way of example, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The NFC communicator may be provided wholly or partially as an integrated circuit or collections of integrated circuits.

DETAILED DESCRIPTION OF THE INVENTION

Figure 1:
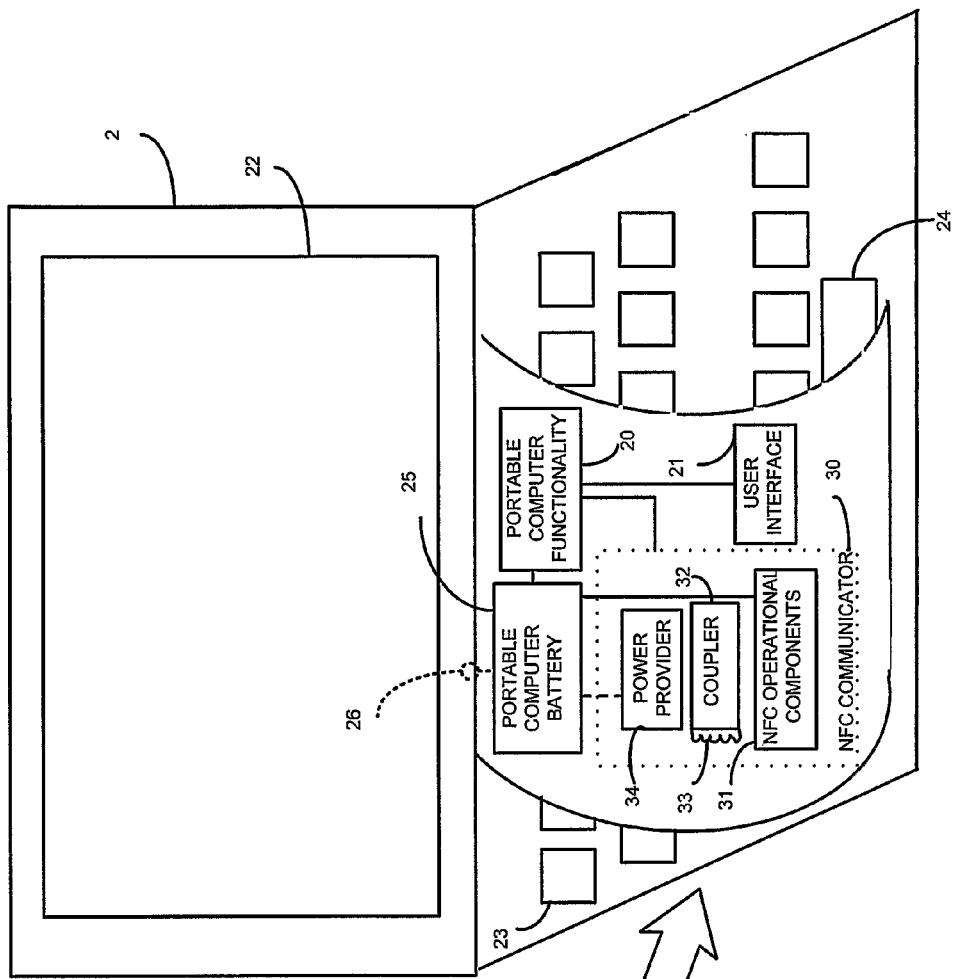
FIG. 1 shows a representational diagram illustrating communication between two devices comprising NFC communicators.
Figure 1:
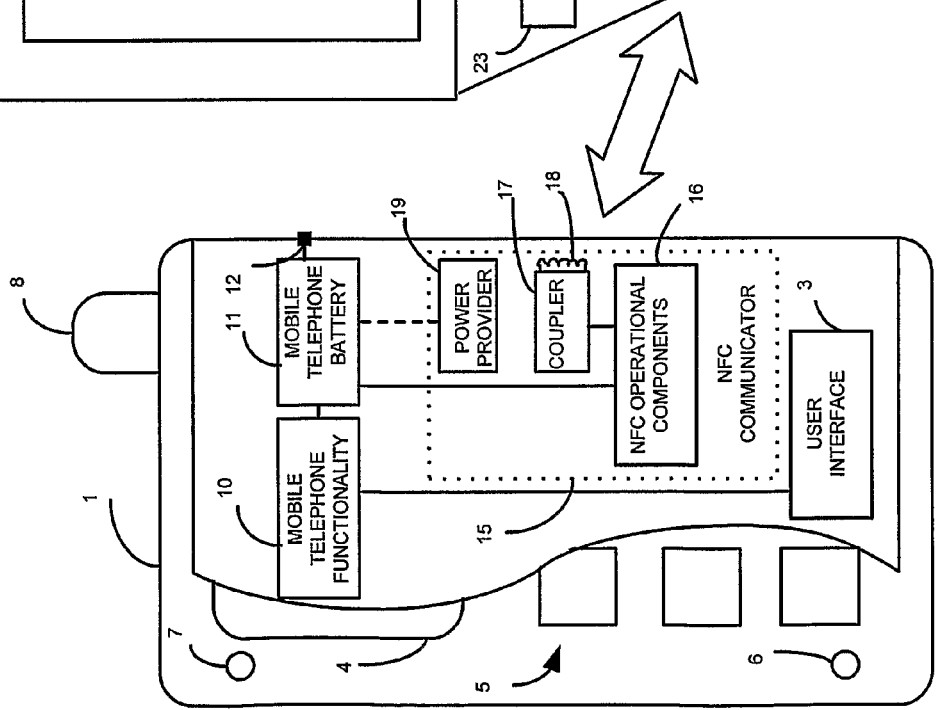

Referring now specifically to FIG. 1, there is shown a representational diagram illustrating communication between two NFC communications enabled devices. In FIG. 1 the representations of the NFC communications enabled devices have been shown partly cut-away and the functionality provided by the NFC communications enabled devices illustrated by way of a functional block diagram within the NFC communications enabled device.

As shown in FIG. 1, one NFC communications enabled device comprises a mobile telephone (cell phone) 1 and the other NFC communications enabled device comprises a portable computer 2 such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25.

In addition, as shown in FIG. 1, both NFC communications enabled devices 1 and 2 have an NFC communicator 15 and 30. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises a coupler 17 and 32 comprising an inductor or coil in the form of an antenna 18 and 33. The couplers 17 and 32 enable an alternating magnetic field (H field) generated by the antenna of one near field RF communicator 15 (or 30) by transmission of an RF signal (for example a 13.56 Mega Hertz signal) to be inductively coupled to the antenna of the other near field RF communicator 30 (or 15) when that antenna is within the near field of the RF signal generated by the one near field RF communicator 15 (or 30).

The NFC communicators 15 and 30 are coupled to the mobile telephone and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 10 or 20, respectively.

Each NFC communicator 15 and 30 also comprises a power provider 19 and 34. The power providers 19 and 34 may be power supplies within the host device or specific to the NFC communicators 15 and 30, for example a button cell battery, or other small battery. As another possibility or additionally as shown by dashed lines in FIG. 1, one or both of the power providers 19 and 34 may simply comprise a coupling to derive power from the corresponding device battery 11 or 25.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device.

Also, rather than being incorporated within the host device, the NFC communicator 15 or 30 may be associated with the host device, for example by a wired or wireless coupling. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications enabled device or an other device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
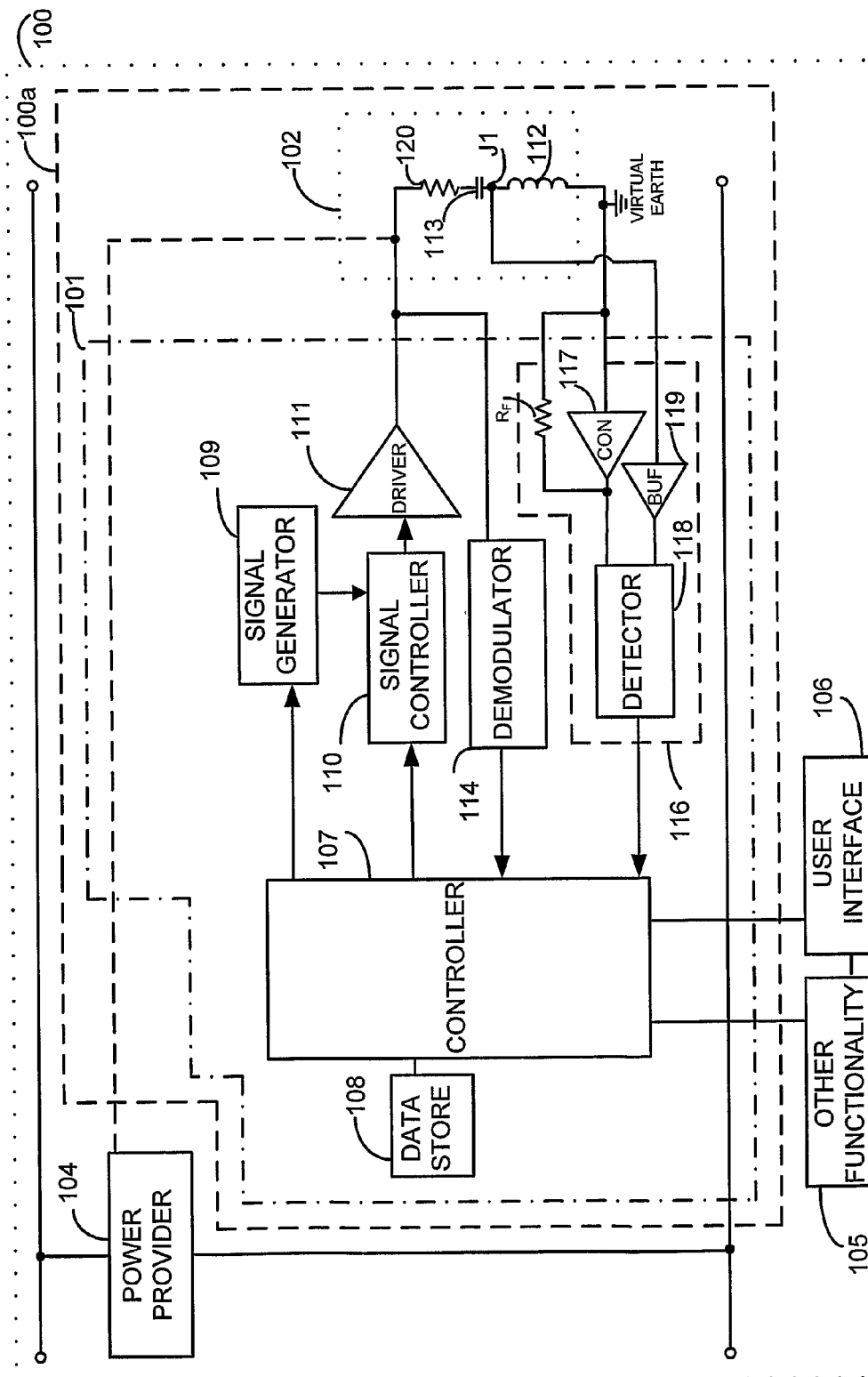
FIG. 2 shows a functional block diagram of an NFC communicator embodying the invention.

FIG. 2 shows a functional block diagram of an NFC communications enabled device 100 in accordance with the invention to illustrate in greater detail one way in which the NFC operational components of an NFC communications enabled device embodying the invention may be implemented.

In this example, the NFC communications enabled device 100 comprises an NFC communicator 100a having NFC operational components 101, an inductive coupler 102 and a power provider 104. In the example shown in FIG. 2, the coupler 102 comprises a series connection to a virtual earth (ground) of a resistor 120, a capacitor 113, and an inductor 112 forming the antenna of the NFC communicator. The power provider 104 may be any one or more of the types of power providers discussed above. In the interests of simplicity, power supply couplings from the power provider 104 to other components are not shown in FIG. 2.

The NFC communications enabled device 100 may or may not also have or be capable of being connected or coupled with at least one of other functionality 105 (for example functionality of a host device such as described above) and a user interface 106.

The NFC operational components 101 also include a demodulator 114 coupled between the coupler 102 and the controller 107 for demodulating a modulated RF signal inductively coupled to the coupler 102 from another near field RF communicator in near field range and for supplying the thus extracted data to the controller 107 for processing. In addition the NFC operational components 101 include components for enabling modulation of an RF signal to enable data to be communicated to another near field RF communicator in near field range of the NFC communicator 100a. As shown in FIG. 2, these components comprise a signal controller 110 coupled via a driver 111 to the coupler 102. In this example, the signal controller 110 causes modulation by gating or switching on and off the RF signal in accordance with the data to be communicated. The NFC communicator may use any appropriate modulation scheme that is in accordance with the standards and/or protocols under which the NFC communicator operates.

The NFC operational components 101 also include a controller 107 for controlling overall operation of the NFC communicator. The controller 107 is coupled to a data store 108 for storing data (information and/or control data) to be transmitted from and/or data received by the NFC communications enabled device. The controller 107 may be a microprocessor, for example a RISC processor or other microprocessor or a state machine. Program instructions for programming the controller and/or control data for communication to another near field RF communicator may be stored in an internal memory of the controller and/or the data store.

The NFC communicator 100a may operate in an initiator mode (that is as an initiating near field RF communicator) or a target mode (that is as a responding near field RF communicator), dependent on the mode to which the NFC communicator is set. The mode may be determined by the controller 107 or may be determined in dependence on the nature of a received near field RF signal. When in initiator mode, an NFC communicator initiates communications with any compatible responding near field RF communicator capable of responding to the initiating NFC communicator (for example an NFC communicator in target mode or an RFID tag or transponder) that is in its near field range, while when in target mode an NFC communicator waits for a communication from a compatible initiating near field RF communicator (for example an NFC communicator in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693.

When in initiator or target mode, the NFC communicator may communicate in accordance with an active or passive protocol. When using an active protocol the initiating NFC communicator will transmit an RF field and following completion of its data communication turn off its RF field. The responding near field RF communicator (target) will then transmit its own RF field and data before again turning off the RF field and so on. When using a passive protocol the NFC communicator (initiator) will transmit and maintain its RF field throughout the entire communication sequence. The protocol used will depend on instructions received from the controller 107 and the response received from a responding near field RF communicator.

When in initiator mode, an NFC communicator embodying the invention is first operable in a sense mode that enables the NFC communicator to sense the presence of a near field RF communicator in near field range without actually communicating with that near field RF communicator, that is without waking or without fully waking up that near field RF communicator.

An NFC communicator embodying the invention thus also has a sensor 116 operable to sense the presence of a near field RF communicator by sensing a change in impedance. When the NFC communicator 100a is initiator mode, that is looking for responding near field RF communicators to communicate with, the controller 107 is operable to cause the NFC communicator 101a to function first in the sense mode in which the controller 107 is operable to control the signal controller 110 to cause the NFC communicator to generate a sense RF signal that will not wake up a near field RF communicator in the vicinity of the NFC communicator 100a but which will result in the presence of a near field RF communicator within its magnetic field (H field) causing a change in impedance that may be sensed by the sensor 116.

The controller 107 may cause the NFC communicator to generate a sense RF signal that will not wake up a responding near field RF communicator by, for example, controlling the signal controller 110 to gate or switch on and off the signal generator 109 so that the RF signal is generated in short bursts that are insufficient to wake up a responding near field RF communicator. The length of a burst (that is the number of cycles of the RF signal in a burst) will be dependent upon the particular NFC communicator and also its host, if the NFC communicator is not a standalone device. Generation of such a burst RF signal requires much less power than generation of a conventional wake up signal. As another possibility the amplitude of the RF signal may be lowered to produce the sense signal. Further, where power savings can be achieved and control of the RF signal frequency is possible, then the sense signal may be at a different frequency from the RF signal used to wake up a responding near field RF communicator. These techniques may be used in any combination, depending upon the particular NFC communicator and any host environment.

When the controller 107 determines that the sensor 116 has sensed the presence of a near field RF communicator, then the controller 107 is operable to control the signal controller 110 to cause the NFC communicator to generate an RF signal that will wake up the sensed near field RF communicator, that is an RF signal that will initiate communication with that near field RF communicator. The wake-up signal may or may not be modulated and the wake-up signal will, of course, depend upon the communications protocol under which the NFC communicator is operating. For example, the wake-up signal may be a modulated signal carrying a wake-up instruction (for example REQA).

An NFC communicator embodying the invention can thus determine whether or not a near field RF communicator is in near field range without having to communicate with that near field RF communicator, that is without having to generate an RF signal of sufficient power to wake up that near field RF communicator. This means that an RF signal of sufficient power and duration to wake up a near field RF communicator need not be generated until the initiating NFC communicator has determined that there actually is a near field RF communicator in near field range. This reduces the drain on the power supply of the NFC communicator during the initial stages of initiating a communication.

The responding near field RF communicator may be another NFC communicator having functional components similar to those shown in FIG. 2 but operating in target mode or could be configured to switch to target mode in response to a wake up signal from an initiating near field RF communicator.

Figure 3:
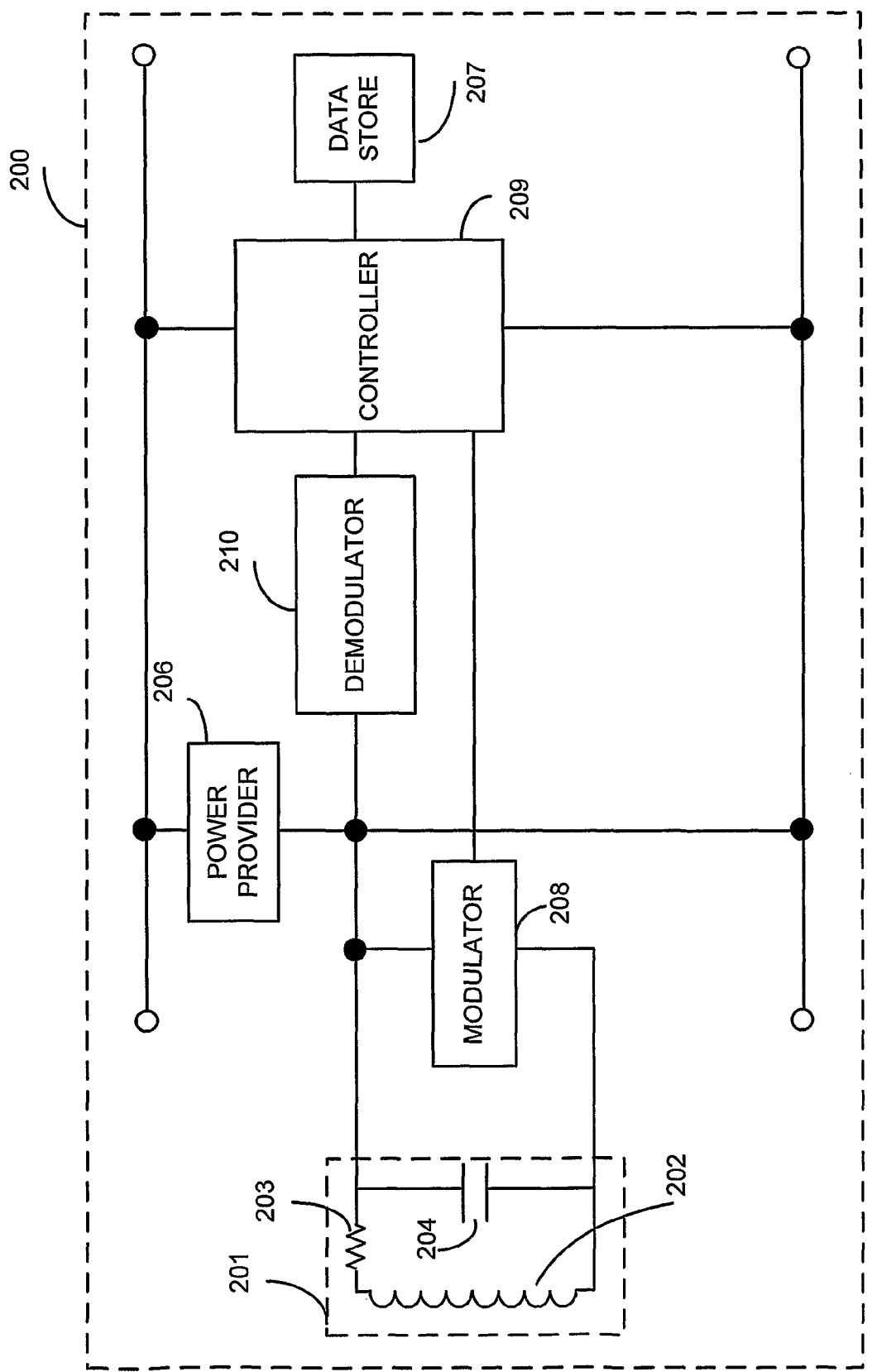
FIG. 3 shows a functional block diagram of a near field RF communicator capable of responding to but not initiating near field RF communication.

As another possibility, the responding near field RF communicator may be an RFID tag or transponder. An example of an RFID tag or transponder 200 is shown in FIG. 3. The transponder 200 comprises an inductive coupler 201 consisting of an inductor 202 forming the antenna in series with a resistor 203 with the series connection of the resistor 203 and inductor 202 being coupled in parallel with a capacitor 204. The transponder 200 also has a power provider 206 which in this example is a power deriver operable to derive a power supply from an RF signal inductively coupled to the transponder 200. As another possibility, or additionally the power provider 206 may comprise a battery so that the transponder is self-powered. In the interests of simplicity, power supply couplings from the power provider to other components are not shown in FIG. 3.

The transponder 200 also has a data store 207 storing data to be communicated to an initiating near field RF communicator and a modulator 208 operable to modulate the inductively coupled RF signal with data read from the data store 207. In the example shown data is read from the data store under the control of a controller 209 which may be, for example, a microprocessor, microcontroller or a state machine. In the example shown the transponder also has a demodulator 210, for example a rectifying diode, operable to demodulate an RF inductively coupled to the transponder and to supply the extracted modulation to the controller 209 to enable the initiating near field RF communicator to supply instructions and/or data to the controller 209. The transponder 200 may be asynchronous, or may be synchronous and so derive a clock signal from an RF signal inductively coupled to it. Examples of transponders or tags are described in WO02/093881, the whole contents of which are hereby incorporated by reference.

Upon receipt of a wake-up signal, the responding near field communicator, whether an NFC communicator in target mode or an RFID tag or transponder, will demodulate the RF signal to extract any data carried by the RF signal and will respond by producing a modulation in accordance with the programming of its controller 209 and/or data stored in the data store 207. In the case of the RFID transponder shown in FIG. 3, the modulator may comprise an FET in parallel with the inductor 202 which is switched on and off in accordance with the data to be communicated so as to modulate the load on the inductive coupling with the initiating NFC communicator.

The initial response of the controller 107 (FIG. 2) or 209 (FIG. 3) to a wake up request may be to modulate the RF signal with an ATQA response or equivalent. Thereafter data communication between the initiator and target will occur by modulation of the RF signal or signals in accordance with the communications protocol under which the communicating devices operate or have agreed to operate where there is more than one possibility.

Figure 4:
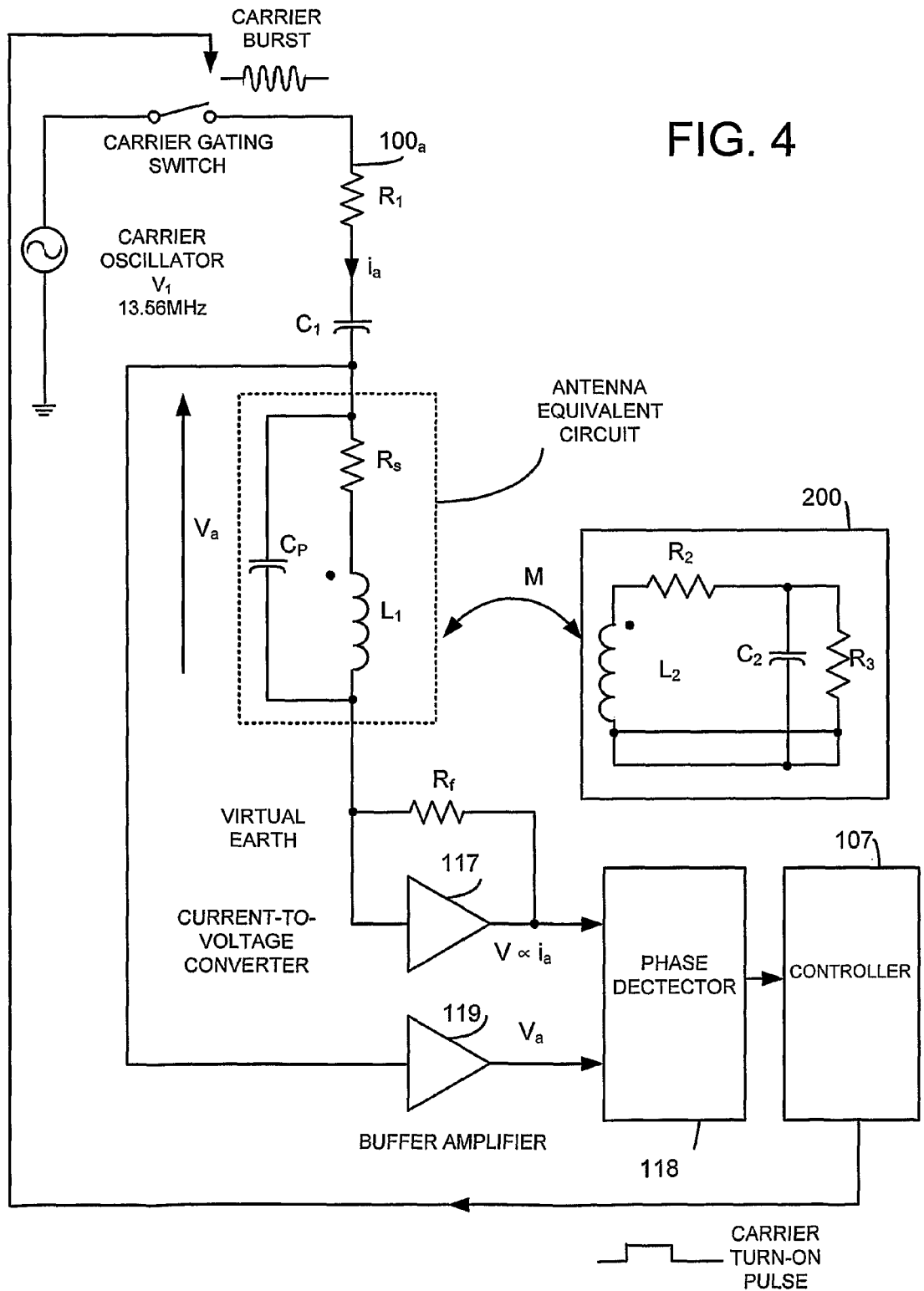
FIG. 4 shows a diagram for explaining operation of the NFC communicator shown in FIG. 2.

An example of how an initiating near field RF communicator embodying the invention in the form of an NFC communicator in initiator mode may sense the presence of a responding near field RF communicator such as the RFID transponder shown in FIG. 3 without actually communicating with that RFID transponder, that is without waking up or at least without fully awakening that RFID transponder, will now be described with the aid of FIGS. 2 and 4 where FIG. 4 shows a schematic circuit diagram for explaining operation of the NFC communicator in sense mode.

In this example, as shown in FIG. 2, the sensor 116 comprises a current-to-voltage converter 117 coupled to the antenna inductor 112 and configured to operate with a virtual earth (ground) input so effectively grounding the antenna. The current-to-voltage converter 117 is operable to output a voltage proportional to the current through the antenna 112. The output of the current-to-voltage converter 117 is coupled to one input of a phase detector 118. A junction J1 between the capacitor 113 and the antenna inductor 12 is coupled to an input of a buffer amplifier 119 which has its output coupled to another input of the phase detector 118. The phase detector 118 is operable to determine the phase difference between the antenna current and the antenna voltage at junction J1 and to supply this phase difference to the controller 107. Any suitable phase detector may be used.

Because, the NFC communicator when operating in sense mode is not transmitting sufficient power to awaken the target, the target antenna may be considered a simple LCR structure with no non-linear behaviour and the target load resistance assumed infinite. Also, for simplicity, the initiator or NFC system antenna may be assumed to be precisely tuned to the carrier frequency (i.e. 13.56 MHz) which is a normal condition in practice.

When the NFC communicator wishes to initiate communication with any in-range target, then the NFC communicator controller 107 controls the signal generator 109 and the signal controller 110 to cause the inductive coupler 102 to generate a sense signal that consists of short bursts of the RF signal and so is insufficient to wake up any in-range near field RF communicator.

The inductive coupler of an initiating near field RF communicator ("initiator") of the form shown in FIG. 2 is a series resonant circuit consisting of the antenna inductor 112, capacitor 113 and resistor 120 providing inductance $L_1$, capacitance $C_1$ and resistance $R_1$ in FIG. 4. The antenna is excited or driven by the RF signal supplied by the signal generator which is represented in FIG. 4 as a carrier oscillator providing a drive voltage $V_1$. In practice, as shown in FIG. 4, the initiator antenna inductance $L_1$ will also possess a parallel (shunt) parasitic capacitance $C_p$ and a series parasitic resistance $R_s$. The antenna winding geometry may however be defined so as to minimise the parallel (shunt) parasitic capacitance $C_p$.

The inductive coupler 201 of a "target" or responding near field RF communicator 200 of the form shown in FIG. 3 comprises the antenna inductor 202, the capacitor 204 and the resistor 203 providing, as shown in FIG. 4, inductance $L_2$, capacitance $C_2$ and resistance $R_2$. In the unpowered state, the load resistance $R_3$ is assumed infinite so that, for small signals, the responding near field RF communicator 200 can be considered as a series resonant circuit comprising inductance $L_2$, capacitance $C_2$ and resistance $R_2$.

In an idealised inductor, the current and voltage will always be 90° out of phase, irrespective of the surrounding circuitry in which the inductor is placed. In practice, inductors have, as shown in FIG. 4, parasitic capacitance and resistance elements $C_p$ and $R_s$ which cause the current-voltage phase relationship to differ from 90°. However, provided these parasitic elements are engineered to be small, then the current and voltage through the initiator antenna inductor 112 in the absence of a target can be considered have a 90° phase difference.

Upon generation of the sense signal by the initiator, the inductive coupler of an in-range target will be inductively coupled to the inductive coupler of the initiator, causing a reflected target impedance to be coupled into the initiator antenna inductance via the mutual inductive coupling M which is the only coupling mechanism between the two near field RF communicators.

The reflected target impedance can be considered as a lumped complex parameter $Z_t$ in series with the initiator inductance, $L_1$. Defining the mutual inductance M as M=k{square root over $(L_1L_2)$}, where k is the coupling coefficient, gives by analysis of the circuit shown in FIG. 3:

$$Z_t = \frac{\omega^2 k^2 L_1 L_2}{R_2 + j\omega L_2 + \frac{R_3}{1 + j\omega R_3 C_2}}$$

so that $Z_t$ is a function of carrier frequency, $L_1$, $L_2$, k, $R_2$, $R_3$ and $C_2$.

The lumped complex parameter $Z_t$ includes capacitive and resistive elements so that there is no longer a 90° phase relationship between the current and voltage through the initiator antenna inductor 112.

The phase detector 118 determines the phase relationship between the current through and voltage across the initiator antenna inductor 112 and the controller 107 of the initiator decides whether or not a target is inductively coupled to the initiator, on the basis of the degree of deviation of the determined current-voltage phase relationship from a 90° phase relationship. The controller 107 may determine that a target is inductively coupled to the initiator when the deviation from a 90° phase relationship exceeds a preset threshold. This threshold may, for example, be determined by a calibration procedure or it may be possible to use a self-learning procedure or neural net type approach in which the controller 107 learns from experience the level at which the threshold should be set. For example, the controller 107 may start with a relatively low threshold and may then raise that threshold in a predetermined manner when it determines that the number of "false" detections is too high (where a "false" detection occurs when the sensor indicates that a target is present but the controller receives no response to a subsequent wake up signal). As another possibility, where the initiating NFC communicator has or is associated with a user interface, then the user may be requested to provide feedback to the controller 107, for example the user may be requested to provide an instruction that the threshold may be too high where the user knows that a target is actually present but the NFC communicator has failed to detect its presence and/or the user may be requested to provide an instruction that the threshold may be too low where the NFC communicator falsely detects the presence of a target when there is in fact no target in range. As another possibility or additionally, the NFC communicator may have a calibration or test mode in which a target is placed in range and the controller of the NFC communicator is operable either to start at a high threshold and to decrease the threshold until the target is sensed or to start at a low threshold and to increase the threshold until the target is no longer sensed. This calibration procedure may be carried out at, for example, factory level when the NFC communicator is in its intended operating environment, that is within its host if it is to operate within a host.

When the NFC communicator is operating in the sense mode, the amplitude of the carrier signal, $V_1$, can be smaller than when the NFC communicator is aiming to wake up a target. For example, the sense mode carrier signal amplitude may be 0.5V as compared to the carrier signal amplitude of several volts that may be used when waking up a target, further QUERY increasing power savings and thus further reducing the drain on the power provider of the initiating NFC communicator.

A number of simulations of the operation of the sensor 116 have been carried out assuming that the initiator antenna is, as described above, operating in a series resonant mode with $L_1$, $C_1$ and $R_1$ specifying resonant frequency and Q. As explained above, as a target resonant circuit is progressively coupled into the initiator antenna inductance, a deviation in the current-voltage ($\angle i_a - \angle V_a$) phase relationship from 90° is observed with, as can be seen from the equation for $Z_t$ above, the magnitude and polarity of this phase deviation being a function of the component values and k.

Where the initiator and target were both tuned to a series resonant circuit frequency of 13.56 MHz, then the magnitude of the deviation of the current-voltage phase relationship from 90° was about 20% over the range in which the coupling coefficient k between the initiator and target antenna inductors varied from 1% to 10% (which is a typical coupling coefficient k variation seen in practice). Where the initiator was tuned to a series resonant circuit frequency of 13.56 MHz and the target tuned to a series resonant circuit frequency of 13.56+10% MHz then the magnitude of the deviation of the current-voltage phase relationship from 90° was about 2% over the range in which the coupling coefficient k between the initiator and target antenna inductors varied from 1% to 10. The magnitude of the deviation of the current-voltage phase relationship from 90° is thus dependent on the relative tuning between the target and initiator antennae with the magnitude of the current-voltage phase deviation dropping from 20% to 2% over the range simulated when the target is tuned to 13.56 (the initiator frequency)+10% MHz. This means that, for example, Mifare Ultralight tags supplied by Philips Electronics which are typically tuned at around 15 MHz would show around a 2° deviation of the current-voltage phase relationship from 90° as k varies from 1% to 10%. Further deviation of tag antenna tuning away from 13.56 MHz would reduce this phase variation further.

Of course, if the phase deviation is very small, a phase detector capable of accurately resolving very small phase shifts will be required and the smaller the phase deviation or shift the greater the design challenge in terms of IC design constraints. In addition, because external effects may act to alter $L_1$, $C_p$ and $R_s$ either individually or in various combinations, although variance in $L_1$ alone will not be a problem, it may sometimes be difficult reliably to discriminate true targets from non-target interactions (resulting from, for example, extraneous metal elements such as keys, etc.). Clearly, any system will not be 100% reliable and will occasionally falsely "detect" a target which is not actually present (a so-called "false positive") which will fully awaken the target and thus waste power while the initiator waits to determine a valid target condition through normal data handshaking protocol. However, it should be recalled that the result of a false positive is that the initiator transmits the wake up signal which would otherwise have been transmitted anyway and even a very poor false alarm or false positive rate of 90% means a 10% rate of correctly determining that there is no target present and a commensurate saving in power because a full wake up procedure is not required for that 10%. Accordingly, even a relatively large number of false positives should result in the overall power drain for an initiating NFC communicator embodying the invention being less than the power drain on the power provider of an initiating NFC communicator that polls by transmitting a wake signal. This is particularly evident when it is recalled that a continuously polling initiator, that is an initiator that is continuously seeking targets by sending out an RF signal, will generally be polling for about 99.9% of its time during operation and will only be engaged in actual communication, that is data read/write operations for around 0.1% at most of its time and possibly even much less (this equates to around 1.5 minutes of read/write activity in 24 hours).

It may be possible to reduce the number of false positive detections by training or teaching the NFC communicator as discussed above.

The above description with reference to FIGS. 2 and 4 assumes that the initiator antenna is in a series resonant mode. The present invention may be applied where the initiator antenna is in a parallel resonant mode. This may be achieved by replacing the $C_1$ in FIG. 4 by a short-circuit and designing the antenna to add a separate tuning component to the antenna shunt parasitic capacitance to set the resonance of the parallel resonant circuit at 13.56 MHz (for simplicity, this modified antenna shunt parasitic capacitance is still referred to herein as $C_p$). The drive current of the parallel resonant circuit $L_1$, $C_p$ and $R_s$ will, of course, be set by selecting the value of $R_1$. The drive current can be small because the resulting RF field is not required to power up the target, but should of course ensure sufficient $V_a$ and $i_a$ amplitude change above noise to enable measurement of the current-voltage phase relationship by the phase detector 118.

Simulations have shown that a significant deviation from 90° in the current-voltage phase relationship $\angle i_a - \angle V_a$ with k occurs where the target antenna is tuned to 15 MHz and that the phase response of the parallel resonant circuit with frequency for various k values has the classic "S" curve behaviour. The simulations have shown that, as k varies, the frequency response effectively "moves" past the operating frequency line (13.56 MHz) and the 13.56 MHz phase deviation locus moves along the "S" curve. This, in turn, produces a significant phase deviation over the k range of 1% to 10% facilitating the operation of the phase detector. Accordingly, by choosing an appropriate baseline tuning (i.e. no target present) for the initiator antenna the $\angle i_a - \angle V_a$ phase deviation can be made to vary over a substantial range as k varies.

Thus replacing the $C_1$ in FIG. 4 by a short-circuit and designing the antenna to add a separate tuning component to the antenna shunt parasitic capacitance to set the resonance of the initiator parallel resonant circuit at 13.56 MHz enables a significant deviation from 90° with k in the current-voltage phase relationship $\angle i_a - \angle V_a$ even where the target resonant frequency is about 10% greater than that of the initiator.

As will be appreciated from the above, the controller 107 is operable to control the NFC communications process to, for example, ensure that the NFC communicator operates in compliance with the appropriate communications protocol(s) and to control the timing (using its own clock where appropriate), manner and mode of operation of the NFC communicator. The controller 107 is also operable to control communication with any host device, where required. Depending upon the circumstances, a change in functionality of the NFC communicator or of any host device may arise as a result of communication with another NFC communications enabled device. Alternatively communication may result in a change to the data stored in either one or both of the data store 108 and controller 107.

The functionality of the controller 107 is shown in FIG. 2 as being entirely within the NFC communicator. As other possibilities, the functionality of the controller 107 may be entirely within any host device controller or distributed between the NFC communicator and the host device. As a further possibility, certain control functionality may reside within a separate unit which is attachable or removable or alternatively only used for certain transactions, for example a security device or ESD device which may only be used for payment transactions. Where the functionality of the controller 107 is within a separate unit or within any host device, then instead of the controller 107 the NFC communicator will have a coupling, possibly including an appropriate interface, to that controller.

As shown in FIGS. 1 and 2, the data store 108 comprises a memory within the NFC communicator. As another possibility, the data store 108 may be comprised within any host device or shared or co-located memory device or data store. For example the data store may reside within the host device and all data may be centrally held within such host device. Alternatively data may be stored both within the NFC communicator (for example data relevant to operation of the NFC functionality) and within a memory (not shown) within the host device (for example data relevant to the operation characteristics of the host device). The data store may be read only or may be read/write, depending upon whether data is to be written to as well as read from the data store.

Where the use of modulation is described above, then any suitable form of modulation scheme may be used, for example FSK (Frequency Shift Key) modulation, PSK (Phase Shift Key) modulation, PDM (Pulse Density Modulation), amplitude modulation, or load modulation. Alternatively or additionally modulation of an RF signal may be provided by sine synthesis (which for example may generate a PDM (Pulse Density Modulation) signal to the driver 111). As a further alternative the NFC communicator may comprise an emulator intended to enable interference or simulated load modulation of a received RF signal as described in greater detail in WO 2005/045744, the whole contents of which are hereby incorporated by reference. In this latter case, the signal generator will be replaced by the circuitry described in WO 2005/045744 that enables interference or simulated load modulation of a received RF signal.

As described above, the initiator is an NFC communicator operating in initiator mode. As another possibility, the initiators described above may be any form of near field RF communicator (such as an RFID reader or transceiver) capable of initiating a near field RF communication with a responding near field RF communicator, but not capable of responding to initiation of near field RF communication. An NFC communicator may operate in accordance with ISO/IEC 18092 and/or ISO/IEC 21481 while an RFID reader or transceiver (that is an RFID initiator) and an RFID transponder or tag (that is an RFID target) may operate fully or partially in accordance with RFID ISO/IEC 14443A or ISO/IEC 15693.

As described above, an initiator near field RF communicator embodying the invention is configured to enable the in-range presence of a target near field RF communicator to be sensed without having to communicate with (that is without having to awaken or to fully awaken) the target near field RF communicator. This avoids expending the time and using the power required to wake up a responding near field RF communicator to initiate communication until the near field RF communicator has determined that a target is actually present in near field range.

As described above, a near field RF communicator embodying the invention is operable to initiate a near field RF communication by first transmitting a sense signal insufficient to wake up a target, then determining whether or not a target is actually within near field range by detecting any change in the impedance of the antenna inductor circuit of the initiator near field RF communicator resulting from mutual inductive coupling between the antenna of the initiator and the antenna of a target of the sense signal generated by the initiator, and by transmitting a wake-up signal to initiate communication only in the event that a change in impedance representing the presence of a target in near field range. As described above, the change in impedance is such as to cause a change in a current-voltage phase relationship and, the initiator uses a phase detector to detect the change in impedance by detecting the resulting change in the phase between the voltage across and the current through the antenna circuit. As another possibility or additionally, the detector may sense the phase change indirectly by sensing a change in current and/or voltage amplitude.

Examples are given above for particular types of antenna circuit. However, the same principles will apply for other appropriate forms of antenna circuit.

As described above, the sense signal is generated by switching on and off the RF signal that is supplied to the antenna circuit of the near field RF communicator that is used during communication. The sense signal may be distinct from the activation or wake up signal. As another possibility, the sense and activation signals may effectively form a single signal with at least one of the duty cycle (burst length), frequency and amplitude of the RF signal changing as the signal changes from a sensing to an activating (wake up) function. As another possibility, a near field RF communicator embodying the invention may have a separate sense antenna that is driven or excited by the same or a separate RF signal generator under the control of the controller 107.

In any of the examples described above, the exact design of the inductor and inductive coupler will depend on the functionality, range and emission standard compliance requirements, plus the environment within which the near field RF communicator is designed to operate.

FIG. 3 shows one example of an RFID transponder. In a simpler example, the transponder may be designed simply to modulate the inductively coupled RF signal with its data once it is powered up. In this case, the demodulator may be omitted and the controller may simply be a clock signal generator or deriver which causes the data store to read out its data once the power provider has derived a supply for the transponder from the inductively coupled RF signal.

In an embodiment, a near field RF communicator has an inductive coupler and a sense signal provider to cause the inductive coupler to provide a sense signal that when inductively coupled to the inductive coupler of another near field RF communicator in near field range is insufficient to cause initiation of communication with that other near field RF communicator. The near field RF communicator also has a sensor to sense a change in an impedance of the inductive coupler due to inductive coupling of the sense signal between the inductive couplers of the said near field RF communicator and a said other near field RF communicator in near field range, and a controller to determine whether or not another near field RF communicator is in near field range on the basis of any change in impedance sensed by the sensor and, if another near field RF communicator is determined to be in near field range, to cause an activation signal to be inductively coupled to the other near field RF communicator to initiate communication between the two near field RF communicators. The sensor may use a phase detector to enable a change in impedance to be sensed by detecting a change in a current-voltage phase relationship resulting from a change in impedance.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A near field RF communicator for initiating communication with a second near field RF communicator, the near field RF communicator comprising:
   a first inductive coupler operable to couple inductively to a second inductive coupler included within the second near field RF communicator in near field range;
   a first signal provider operable to cause the first inductive coupler to provide a first signal to the second near field RF communicator, wherein the first signal is insufficient to cause initiation of communication with the second near field RF communicator;
   a sensor operable to sense a change in an impedance of the first inductive coupler due to inductive coupling between the first inductive coupler and the second inductive coupler;
   a determiner operable to determine whether the second near field RF communicator is in near field range on a basis of any change in the impedance of the first inductive coupler sensed by the sensor; and
   an activation signal provider operable, in response to the determiner determining that the second near field RF communicator is in near field range, to supply a second signal to initiate communication between the near field RF communicator and the second near field RF communicator,
   wherein the first signal provider and the activation signal provider are different signal providers.

2. A near field RF communicator according to claim 1, wherein the first signal provider and the activation signal provider are operable to supply the first and second signals such that the first signal is of lower power than the second signal.

3. A near field RF communicator according to claim 1, wherein the first signal provider and the activation signal provider are operable to supply the first and second signals such that the first signal comprises signal bursts.

4. A near field RF communicator according to claim 1, wherein the first signal provider and the activation signal provider are operable to supply the first and second signals such that the first signal is of lower amplitude than the second signal.

5. A near field RF communicator according to claim 1, wherein the first signal provider and the activation signal provider are operable to supply the first and second signals such that the first and second signals are of different frequencies.

6. A near field RF communicator according to claim 1, wherein the first signal provider and the activation signal provider comprise a single signal provider.

7. A near field RF communicator according to claim 1, wherein the first and second signals comprise different modes of the same signal.

8. A near field RF communicator according to claim 1, wherein the activation signal provider is operable to supply the second signal to the first inductive coupler.

9. A near field RF communicator according claim 1, wherein the activation signal provider is operable to supply the second signal to the second inductive coupler, included within the second near field RF communicator, wherein the second inductive coupler is separate from the first inductive coupler.

10. A near field RF communicator according to claim 1, wherein the sensor is operable to sense a change in impedance by detecting a difference in phase between a current through and a voltage of the first inductive coupler.

11. A near field RF communicator according to claim 1, wherein the near field RF communicator is battery-powered, an NFC communicator, an RFID reader, RFID transceiver, or operable under ISO/IEC 18092 or ISO/IEC 21481.

12. A near field RF communicator according to claim 1, wherein the near field RF communicator is provided within an attachable housing, a housing portion, in an access card, or a housing resembling a smart card.

13. An electrical device comprising a near field RF communicator according to claim 1, wherein the near field RF communicator is integrated within the functionality of the electrical device and includes at least one integrated circuit within the electrical device and wherein the electrical device includes a user interface for enabling a user to input instructions to control an operation of the near field RF communicator.

14. An electrical device according to claim 13, wherein the device comprises at least one of a mobile telephone, a portable computing device such as a personal digital assistant, notebook, or lap-top, a personal or desk top computer, a computer peripheral such as a printer, or other electrical device such as a portable audio and/or video player.

15. A portable communications device incorporating a near field RF communicator according to claim 1.

16. A near field RF communicator according to claim 1, wherein the first signal is created by controlling the first signal provider to switch ON and OFF a signal generator in accordance with data to be communicated.

17. A near field RF communicator for initiating communication with a second near field RF communicator, the near field RF communicator comprising:
 a sense antenna operable to couple inductively with an antenna of the second near field RF communicator;
 an RF signal provider operable to cause the sense antenna to provide a first signal to the second near field RF communicator, wherein the first signal is insufficient to cause initiation of communication with the second near field RF communicator;
 a detector operable to provide a detection signal indicative of a change in a phase relationship between a current through and a voltage of the sense antenna, wherein the change in the phase relationship results from a mutual inductive coupling of the first signal between the sense antenna and the antenna of the second near field RF communicator in near field range; and
 a controller operable to determine when the second near field RF communicator is in near field range by receiving detection signal from the detector, wherein the detection signal is indicative of the presence of the second near field RF communicator, and wherein the controller is further operable to control the RF signal provider to cause a second signal to be inductively coupled to the second near field RF communicator in near field range, wherein the second signal initiates communication with the second near field RF communicator, and wherein the detector is positioned outside of the controller.

18. A near field RF communicator according to claim 17, further comprising a signal controller operable to provide the first signal by interrupting an oscillating signal to provide bursts of the oscillating signal.

19. A near field RF communicator according to claim 17, wherein the RF signal provider causes the sense antenna to function as both the sense antenna and as a communication antenna, by instructing the sense antenna to produce the second signal.

20. A near field RF communicator operable to act as an initiator to initiate communication with a target near field RF communicator, the initiator being operable in a power saving sense mode, to provide a first signal that enables the initiator to sense the presence of the target near field RF communicator when in near field range without initiating communication with the target near field RF communicator, and in a communication initiation mode in which the initiator is operable to provide a second signal to cause initiation of communication between the target near field RF communicator and the initiator, the initiator being operable to sense a change in an impedance resulting from the presence of the target near field RF communicator in near field range and to switch from the power saving sense mode to the communication initiation mode in response to such a change in the impedance, wherein the near field RF communicator provides the first signal while in the power saving sense mode and before the near field RF communicator switches from the power saving sense mode into any other mode.

* * * * *

UNITED STATES PATENT AND TRADEMARK OFFICE
CERTIFICATE OF CORRECTION

PATENT NO. : 8,140,010 B2  
APPLICATION NO. : 12/446591  
DATED : March 20, 2012  
INVENTOR(S) : Symons et al.

Page 1 of 1

It is certified that error appears in the above-identified patent and that said Letters Patent is hereby corrected as shown below:

In the Claims:

Column 17, Line 13, please replace "device and" with --device, and--.

Signed and Sealed this  
Sixth Day of May, 2014

Michelle K. Lee  
*Deputy Director of the United States Patent and Trademark Office*